(12) United States Patent
Katayama et al.

(10) Patent No.: US 11,477,099 B2
(45) Date of Patent: Oct. 18, 2022

(54) MONITORING SYSTEM

(71) Applicant: Nippon Telegraph and Telephone Corporation, Tokyo (JP)

(72) Inventors: Yohei Katayama, Tokyo (JP); Kenji Suzuki, Tokyo (JP); Kazumitsu Sakamoto, Tokyo (JP); Yosuke Fujino, Tokyo (JP); Hiroyuki Fukumoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/434,917

(22) PCT Filed: Mar. 10, 2020

(86) PCT No.: PCT/JP2020/010251
§ 371 (c)(1),
(2) Date: Aug. 30, 2021

(87) PCT Pub. No.: WO2020/189404
PCT Pub. Date: Sep. 24, 2020

(65) Prior Publication Data
US 2022/0131778 A1 Apr. 28, 2022

(30) Foreign Application Priority Data
Mar. 18, 2019 (JP) .............................. JP2019-049633

(51) Int. Cl.
*H04L 43/0817* (2022.01)
*G06F 11/30* (2006.01)
(52) U.S. Cl.
CPC ...... *H04L 43/0817* (2013.01); *G06F 11/3055* (2013.01)

(58) Field of Classification Search
CPC . H04L 43/0817; G06F 11/3055; H04W 28/02
(Continued)

(56) References Cited

U.S. PATENT DOCUMENTS

2010/0074236 A1   3/2010  Takeda et al.
2012/0066371 A1*  3/2012  Patel .................. H04L 67/1031
                                                            709/224
(Continued)

FOREIGN PATENT DOCUMENTS

JP    2009239623    10/2009
JP    2011034403    2/2011
(Continued)

OTHER PUBLICATIONS

Case et al., "A Simple Network Management Protocol (SNMP)," Network Working Group Requestfor Comments: 1157, May 1990, retrieved from URL <https://tools.ietf.org/html/rfc1157>, 36 pages.

*Primary Examiner* — Meng Vang
(74) *Attorney, Agent, or Firm* — Fish & Richardson P.C.

(57) ABSTRACT

A monitoring system comprises a monitoring agent that keeps information related to a communication status of a low-power terminal that communicates under low power, and a monitoring device that monitors the status of the low-power terminal. The monitoring device includes a requesting unit that requests information related to the communication status of the low-power terminal. The monitoring agent includes a response generation unit that generates a response to the request from the monitoring device on a basis of the information related to the communication status of the low-power terminal, and a transmission unit that transmits the response to the monitoring device.

5 Claims, 16 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 2014/0330955 A1* | 11/2014 | Bishop | ................... | H04L 67/00 |
| | | | | 709/224 |
| 2015/0188837 A1* | 7/2015 | Djukic | ................... | H04L 47/70 |
| | | | | 709/226 |
| 2015/0195176 A1* | 7/2015 | Vasseur | ................... | H04L 43/12 |
| | | | | 709/224 |
| 2017/0134249 A1* | 5/2017 | Laing | ................... | A61B 5/4806 |
| 2019/0053252 A1* | 2/2019 | Park | ...................... | H04L 47/824 |

FOREIGN PATENT DOCUMENTS

| | | |
|---|---|---|
| JP | 2015114991 | 6/2015 |
| JP | 2015228690 | 12/2015 |

* cited by examiner

Fig. 3

| TERMINAL ID | IP ADDRESS |
|---|---|
| ED-1 | VVV |
| ED-2 | UUU |
| ⋮ | ⋮ |

| TERMINAL ID | IP ADDRESS | COMMUNICATION LOGGING TIME | RECEIVED SIGNAL STRENGTH | WIRELESS CHANNEL | PAYLOAD SIZE | 332 |
|---|---|---|---|---|---|---|
| ED-1 | VVV | YYMMDD | -100dB | CH1 | 100byte | ... |
| ED-2 | UUU | YYMMDD | -120dB | CH2 | 100byte | ... |
| ... | ... | ... | ... | ... | ... | ... |

Fig. 5

| MONITORING COMMUNICATION PROTOCOL ATTRIBUTE NAME | COMMUNICATION LOG DATABASE COLUMN NAME |
|---|---|
| 1.3.6.1.4.1.1.1.1.0 | RECEIVED SIGNAL STRENGTH |
| 1.3.6.1.4.1.1.1.2.0 | WIRELESS CHANNEL |
| ⋮ | ⋮ |

333

MONITORING SYSTEM

CROSS-REFERENCE TO RELATED APPLICATIONS

This application is a National Stage application under 35 U.S.C. § 371 of International Application No. PCT/JP2020/010251, having an International Filing Date of Mar. 10, 2020, which claims priority to Japanese Application Serial No. 2019-049633, filed on Mar. 18, 2019. The disclosure of the prior application is considered part of the disclosure of this application, and is incorporated in its entirety into this application.

TECHNICAL FIELD

The present invention relates to a monitoring system.

BACKGROUND ART

In the related art, Simple Network Management Protocol (SNMP) is used to monitor communication infrastructure (see Non-Patent Literature 1). In monitoring using SNMP, a monitoring device performs status monitoring by steadily acquiring status information from devices being monitored. Such monitoring using SNMP is also used with Internet of Things (IoT) devices such as sensors.

CITATION LIST

Non-Patent Literature

Non-Patent Literature 1: "A Simple Network Management Protocol (SNMP)", Network Working Group, [retrieved on Mar. 15, 2019], Internet <URL: https://tools.ietf.org/html/rfc1157>

SUMMARY OF THE INVENTION

Technical Problem

Meanwhile, low-power wide-area (LPWA) is generally used as the wireless communication technology for IoT. Many LPWA terminals are battery-powered, and the battery capacity is extremely small. Consequently, if an LPWA terminal responds the steady monitoring communication generated by SNMP monitoring, the battery life of the terminal is shortened considerably. For this reason, in the case of monitoring the status of an LPWA terminal, there is a demand to reduce the power consumption of the terminal communicating at low power. Note that such a problem is not limited to monitoring using SNMP, and is also a problem that occurs similarly in monitoring using other communication protocols for monitoring.

In light of the above circumstances, an object of the present invention is to provide a technology capable of reducing the power consumption of a terminal that communicates at low power.

Means for Solving the Problem

One aspect of the present invention is a monitoring system comprising a monitoring agent that keeps information related to a communication status of a low-power terminal that communicates under low power, and a monitoring device that monitors the status of the low-power terminal. The monitoring device includes a requesting unit that requests information related to the communication status of the low-power terminal. The monitoring agent includes a response generation unit that generates a response to the request from the monitoring device on a basis of the information related to the communication status of the low-power terminal, and a transmission unit that transmits the response to the monitoring device.

According to another aspect of the present invention, in the above monitoring system, the monitoring agent groups a plurality of the low-power terminals under singular address information, and the response generation unit generates the response to the request from the monitoring device in units of groups.

According to another aspect of the present invention, in the above monitoring system, the monitoring device further includes a status determination unit that determines the status of the low-power terminal on a basis of information included in the response, and the status determination unit performs any or all of congestion determination, communication quality estimation, and obstruction determination as status monitoring of the low-power terminal, on the basis of the information included in the response.

According to another aspect of the present invention, the above monitoring system further comprises a setting and design control unit that performs any or all of controlling a setting in a relay device to which the low-power terminal connects, controlling a network design, and controlling a setting in the low-power terminal on a basis of a result of the status monitoring.

According to another aspect of the present invention, in the above monitoring system, the status determination unit computes a resource utilization and an amount of interference with another system on the basis of an amount of traffic in a group and a time ratio of interference with another system, estimates a communication quality in the group on a basis of a communication frequency and a received signal strength in the group, and estimates a failure location in the group on a basis of the communication frequency and a packet loss rate.

According to another aspect of the present invention, in the above monitoring system, the setting and design control unit controls any of a channel setting or a transmission output in the relay device, a communication route in a group including the relay device and the low-power terminal, and a setting in the low-power terminal according to a resource utilization, a communication quality, an amount of interference with another system, or a failure location.

According to another aspect of the present invention, in the above monitoring system, the setting and design control unit increases or decreases a number of the relay devices or changes an arrangement of the relay devices to balance a communication load on a basis of any of a resource utilization, a communication quality, and an amount of interference with another system, as the controlling of the network design.

Effects of the Invention

According to the present invention, it is possible to reduce the power consumption of a terminal that communicates at low power.

BRIEF DESCRIPTION OF DRAWINGS

FIG. 3 is a diagram illustrating an example of an association database according to the embodiment.

FIG. 4 is a diagram illustrating an example of a communication log database according to the embodiment.

FIG. 5 is a diagram illustrating an example of an analysis table according to the embodiment.

DESCRIPTION OF EMBODIMENTS

Hereinafter, an embodiment of the present invention will be described with reference to the drawings.

Figure 1:
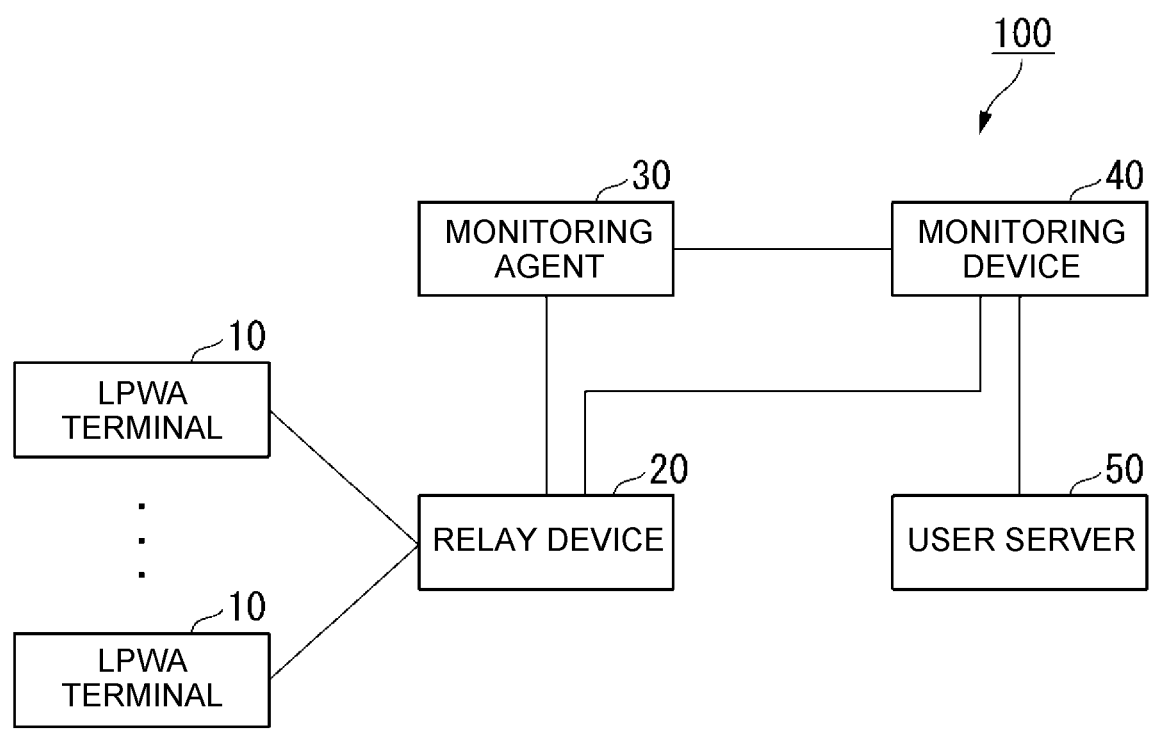
FIG. 1 is a diagram illustrating a system configuration of a monitoring system according to the present invention.

FIG. 1 is a diagram illustrating a system configuration of a monitoring system 100 according to the present invention. The monitoring system 100 is provided with an LPWA terminal 10, a relay device 20, a monitoring agent 30, a monitoring device 40, and a user server 50. Note that the monitoring system 100 may also be provided with two or more LPWA terminals 10 and relay devices 20.

The LPWA terminal 10 is battery-powered, and communicates with the relay device 20 using LPWA. The LPWA terminal 10 is a sensor that measures a property of the environment, for example. The property of the environment may be the temperature, the humidity, or a quantity of water, for example. The LPWA terminal 10 periodically (every 10 minutes or every hour, for example) transmits a measurement result to the relay device 20. The measurement result contains a terminal ID, a terminal address, and a measurement value. Note that the LPWA terminal 10 is not limited to a sensor, and may be any kind of terminal that uses LPWA and is also battery-powered. Any of LoRa (registered trademark), SIGFOX (registered trademark), and Narrow Band IoT (NB-IoT) may be used as the LPWA.

The relay device 20 keeps a log of data communication with each LPWA terminal 10 connected to itself, and periodically transmits the log to the monitoring agent 30. The log of data communication contains information such as the terminal ID, the terminal address, a communication logging time, a received signal strength (radio field intensity), a wireless channel, and a payload size. Additionally, the relay device 20 transmits information transmitted from the user server 50 to the LPWA terminal 10. The relay device 20 also changes its own settings on the basis of information transmitted from the monitoring device 40.

The monitoring agent 30 keeps the log of data communication transmitted from the relay device 20. The monitoring agent 30 creates a response to a monitoring request transmitted from the monitoring device 40, and transmits the created response to the monitoring device 40. The monitoring agent 30, acting as a proxy for the LPWA terminal 10, transmits information related to the communication status of the LPWA terminal 10 to the monitoring device 40 as a response. The monitoring agent 30 is configured using an information processing device such as a laptop, a personal computer, a smartphone, a mobile phone, a tablet, or a game console, for example.

The monitoring device 40 implements a monitoring communication protocol (SNMP, for example), and requests the monitoring agent 30 to transmit the data communication log. The monitoring device 40 performs status monitoring of the LPWA terminal 10 and the relay device 20 on the basis of the obtained data communication log. The status monitoring includes congestion determination, communication quality estimation, and failure determination, for example. The monitoring device 40 controls settings in the relay device 20, the design of the network, and settings in the LPWA terminal 10 on the basis of the result of the status monitoring. The monitoring device 40 is configured using an information processing device such as a laptop, a personal computer, a smartphone, a mobile phone, a tablet, or a game console, for example.

The monitoring device 40 performs status monitoring in units of groups, and monitors the status of the LPWA terminal 10 and the relay device 20 belonging to a group. The units of the groups do not need to be limited particularly. For example, the LPWA terminals 10 connected to the same relay device 20 may form a group, or a plurality of relay devices 20 may belong to a single group. In the following description, an example of performing status monitoring in units of groups containing the LPWA terminals 10 connected to the same relay device 20 will be described. Each group is identified by an IP address assigned to identify the group to the monitoring agent 30.

The user server 50 controls settings in the LPWA terminal 10 through the relay device 20 according to an instruction from the monitoring device 40. The user server 50 is configured using an information processing device such as a laptop, a personal computer, a smartphone, a mobile phone, a tablet, or a game console, for example.

Figure 2:
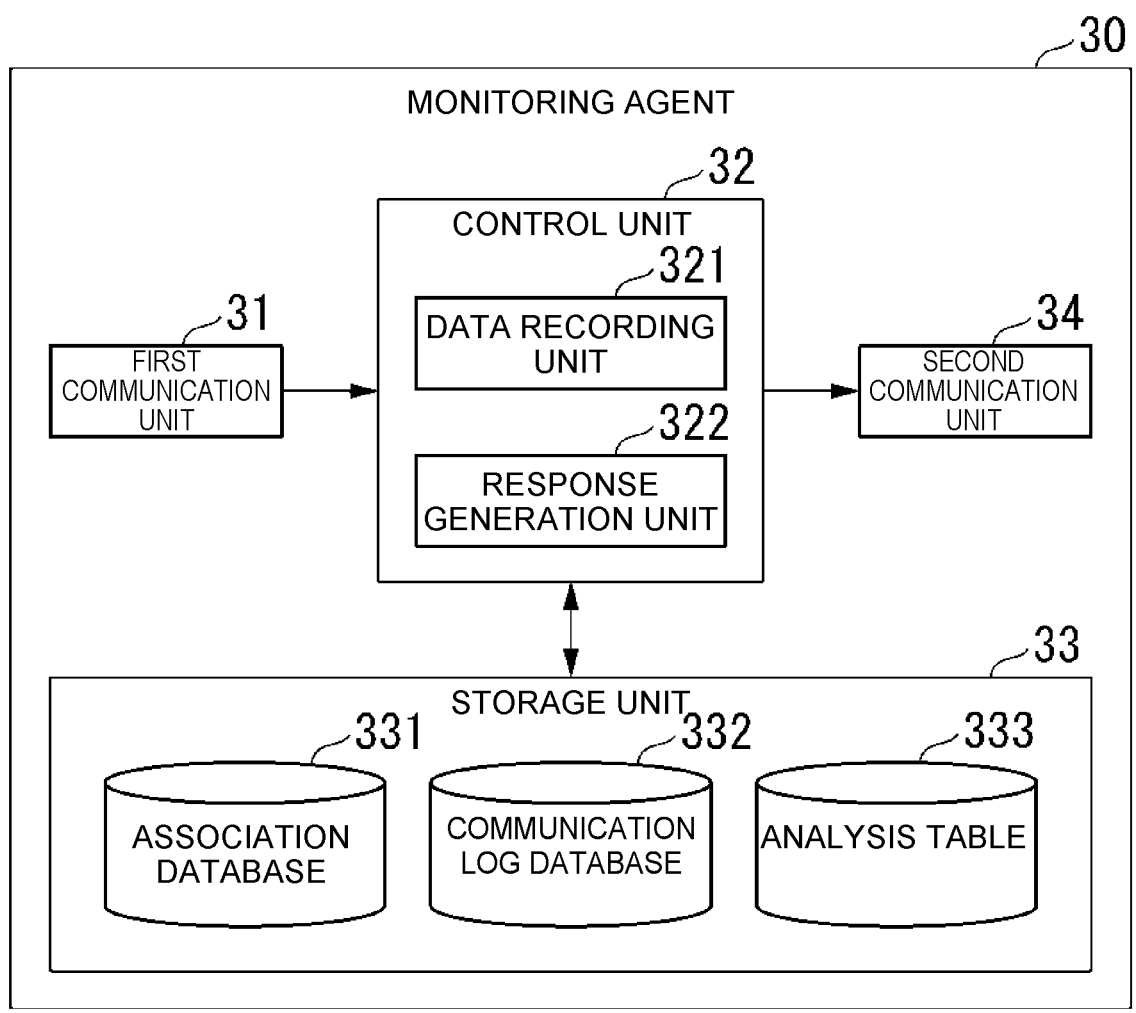
FIG. 2 is a schematic block diagram illustrating a functional configuration of a monitoring agent according to an embodiment.

FIG. 2 is a schematic block diagram illustrating a functional configuration of the monitoring agent 30 according to the embodiment.

The monitoring agent 30 is provided with components such as a central processing unit (CPU), memory, and an auxiliary storage device connected by a bus, and executes a monitoring program. By executing the monitoring program, the monitoring agent 30 functions as a device provided with a first communication unit 31, a control unit 32, a storage unit 33, and a second communication unit 34. Note that some or all of the functions of the monitoring agent 30 may also be achieved using hardware, such as an application-specific integrated circuit (ASIC), a programmable logic device (PLD), or a field-programmable gate array (FPGA). In addition, the monitoring program may also be recorded onto a computer-readable recording medium. The computer-readable recording medium refers to a portable medium such as a flexible disk, a magneto-optical disc, ROM, or a CD-ROM, or a storage device such as a hard disk built into a computer system, for example. The monitoring program may also be transmitted and received over an electrical communication channel.

The first communication unit 31 communicates with the relay device 20. The first communication unit 31 receives the log of data communication from the relay device 20.

The control unit 32 is configured using a processor such as a CPU and memory. The control unit 32 functions as a data recording unit 321 and a response generation unit 322.

The data recording unit 321 records, in the storage unit 33, a predetermined IP address corresponding to the terminal ID in association with the data communication log received by the first communication unit 31. The predetermined IP address is associated with each terminal ID in advance. For example, the same IP address is associated with the terminal IDs of the LPWA terminals 10 belonging to a single group. With this arrangement, it is possible to manage information in units of groups.

The response generation unit 322 generates a response to a monitoring request transmitted from the monitoring agent 30.

The storage unit 33 stores an association database 331, a communication log database 332, and an analysis table 333. The storage unit 33 is configured using a storage device such as a magnetic hard disk device or a semiconductor memory device.

Figure 3:
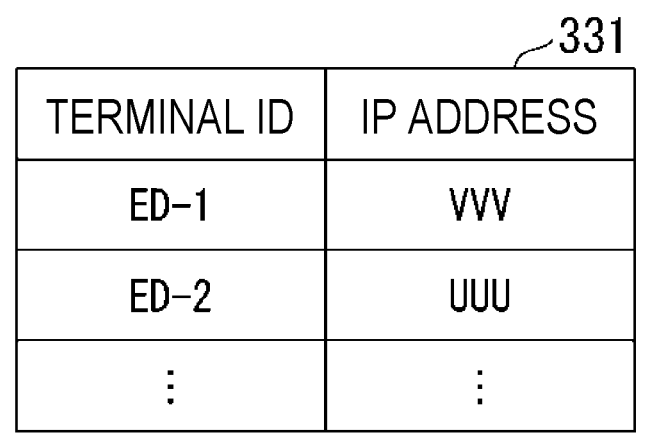

The association database 331 has the configuration illustrated in FIG. 3, and is a database in which terminal IDs and IP addresses are registered in association with each other. FIG. 3 is a diagram illustrating an example of the association database 331. The association database 331 contains a plurality of records expressing information related to associations between terminal IDs and IP addresses. Each record contains a terminal ID value and an IP address value. The terminal ID expresses identification information for identifying the LPWA terminal 10. The IP address expresses the IP address to be associated with the terminal ID. The IP address is the IP address assigned to the monitoring agent 30.

In the example illustrated in FIG. 3, a plurality of terminal IDs are registered in the association database 331. These terminal IDs are "ED-1" and "ED-2". In FIG. 3, the record registered in the top row of the association database 331 contains the terminal ID value "ED-1" and the IP address value "vvv". In other words, the record indicates that the IP address "vvv" is associated with the data communication log related to the LPWA terminal 10 identified by the terminal ID "ED-1".

The communication log database 332 has the configuration illustrated in FIG. 4, and is a database in which information related to the data communication log is registered. FIG. 4 is a diagram illustrating an example of the communication log database 332. The communication log database 332 contains a plurality of records expressing information related to the data communication log. Each record contains values for a terminal ID, an IP address, a communication logging time, a received signal strength, a wireless channel, and a payload size. The terminal ID expresses identification information for identifying the LPWA terminal 10. The IP address expresses the IP address to be associated with the terminal ID. The communication logging time expresses the time at which a measurement result is received by the relay device 20. The received signal strength expresses the signal strength when the measurement result is received by the relay device 20. The wireless channel expresses the channel when the measurement result is received by the relay device 20. The payload size expresses the size of the payload of the measurement result received by the relay device 20.

In the example illustrated in FIG. 4, a plurality of terminal IDs are registered in the communication log database 332. These terminal IDs are "ED-1" and "ED-2". In FIG. 4, the record registered in the top row of the communication log database 332 contains the terminal ID value "ED-1", the IP address value "vvv", the communication logging time value "YYMMDD", the received signal strength value "−100 dB", the wireless channel value "CH1", and the payload size value "100 byte". In other words, the record indicates that the IP address "vvv" is associated with the data communication log related to the LPWA terminal 10 identified by the terminal ID "ED-1", the time when the measurement result was received is "YYMMDD", the signal strength when the measurement result was received is "−100 dB", the channel when the measurement result was received is "CH1", and the size of the payload of the measurement result is "100 byte".

The analysis table 333 has the configuration illustrated in FIG. 5, and is a database in which information designated by the monitoring communication protocol and post-analysis information are registered in association with each other. FIG. 5 is a diagram illustrating an example of the analysis table 333. The analysis table 333 contains a plurality of records associating information designated by the monitoring communication protocol and post-analysis information. Each record contains a monitoring communication protocol attribute name value and a communication log database column name value. The monitoring communication protocol attribute name expresses an identifier of an individual piece of information designated by the monitoring communication protocol. For example, the monitoring communication protocol attribute name is an OID. The communication log database column name expresses the name of a column in the communication log database 332 corresponding to the monitoring communication protocol attribute name.

In the example illustrated in FIG. 5, a plurality of monitoring communication protocol attribute names are registered in the analysis table 333. These monitoring communication protocol attribute names are "1.3.6.1.4.1.1.1.1.0" and "1.3.6.1.4.1.1.1.2.0". In FIG. 5, the record registered in the top row of the analysis table 333 contains the monitoring communication protocol attribute name value "ED-1", the IP address value "vvv", the communication logging time value "1.3.6.1.4.1.1.1.1.0", and the communication log database column name value "Received Signal Strength". In other words, the record indicates that in the case where information designated by the monitoring communication protocol has an identifier of "1.3.6.1.4.1.1.1.1.0", the information being indicated by the identifier is "Received Signal Strength".

The description will return to FIG. 2 and proceed.

The second communication unit 34 communicates with the monitoring device 40. For example, the second communication unit 34 receives a monitoring request from the monitoring device 40, and transmits information designated by the received monitoring request to the monitoring device 40 as a response. The monitoring request contains a destination IP address and a monitoring communication protocol attribute name. Note that the monitoring request may also contain a plurality of monitoring protocol attribute names.

Figure 6:
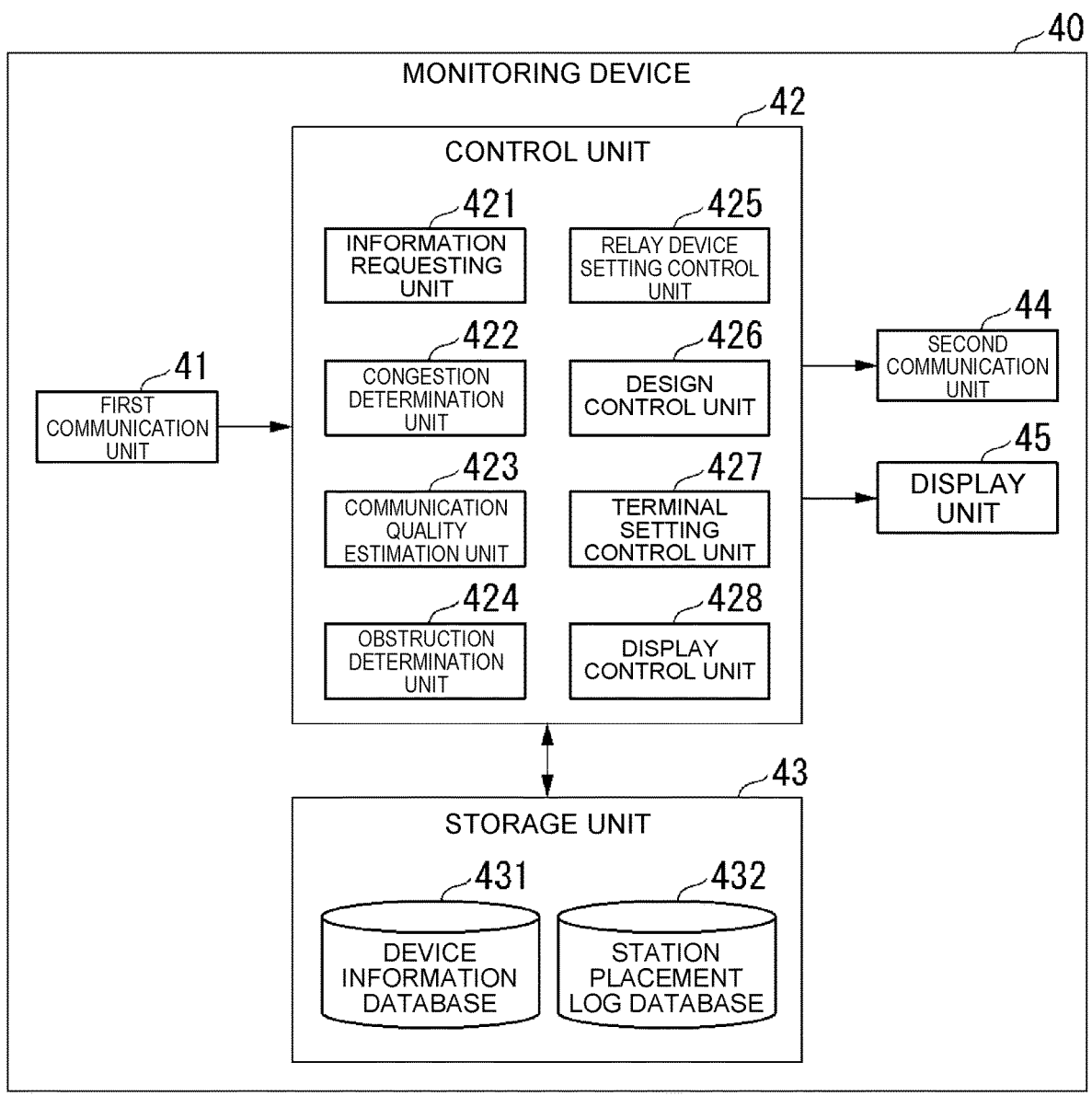
FIG. 6 is a schematic block diagram illustrating a functional configuration of a monitoring device according to the embodiment.

FIG. 6 is a schematic block diagram illustrating a functional configuration of the monitoring device 40 according to the embodiment.

The monitoring device 40 is provided with components such as a CPU, memory, and an auxiliary storage device connected by a bus, and executes a monitoring program. By executing the monitoring program, the monitoring device 40 functions as a device provided with a first communication unit 41, a control unit 42, a storage unit 43, a second communication unit 44, and a display unit 45. Note that some or all of the functions of the monitoring device 40 may also be achieved using hardware, such as an ASIC, a PLD, or an FPGA. In addition, the monitoring program may also be recorded onto a computer-readable recording medium. The computer-readable recording medium refers to a portable medium such as a flexible disk, a magneto-optical disc, ROM, or a CD-ROM, or a storage device such as a hard disk built into a computer system, for example. The monitoring program may also be transmitted and received over an electrical communication channel.

The first communication unit 41 communicates with the monitoring agent 30. For example, the first communication unit 41 transmits a monitoring request to the monitoring agent 30, and receives a response to the monitoring request from the monitoring agent 30.

The control unit 42 is configured using a processor such as a CPU and memory. The control unit 42 functions as an information requesting unit 421, a congestion determination unit 422, a communication quality estimation unit 423, an obstruction determination unit 424, a relay device setting control unit 425, a design control unit 426, a terminal setting control unit 427, and a display control unit 428.

The information requesting unit 421 requests the monitoring agent 30 for information related to communication with the LPWA terminal 10. Specifically, the information requesting unit 421 requests information related to communication with the LPWA terminal 10 by generating a monitoring request and transmitting the generated monitoring request to a predetermined address.

The congestion determination unit 422 performs a congestion determination process on the basis of the information related to communication with the LPWA terminal 10 included in the response. The congestion determination process refers to a process of determining whether or not congestion is occurring within the group. In the embodiment, one or both of a congestion determination according to the amount of interference with other systems and a congestion determination according to the resource utilization are executed as the congestion determination process.

The communication quality estimation unit 423 estimates the communication quality on the basis of the information related to communication with the LPWA terminal 10 included in the response. Specifically, the communication quality estimation unit 423 determines whether a predetermined service standard is satisfied for the group as a whole by acquiring the loss rate and the received signal strength of communication from each LPWA terminal 10, and totaling the acquired loss rates and received signal strengths for all of the LPWA terminals 10 in the group.

The obstruction determination unit 424 performs an obstruction determination process on the basis of the information related to communication with the LPWA terminal 10 included in the response. The obstruction determination process refers to a process of determining whether or not an obstruction exists in the group and also determining the cause of the obstruction. In the embodiment, the obstruction determination unit 424 determines whether the cause of a communication obstruction is due to the relay device 20, the communication quality of the wireless segment, or the LPWA terminal 10, on the basis of the alive status of the relay device 20 and the arrival rate of communication from a plurality of LPWA terminals 10 capable of communicating with the relay device 20.

The relay device setting control unit 425 controls settings in the relay device 20 on the basis of the result of the status monitoring. Specifically, the relay device setting control unit 425 controls settings in the relay device 20 such as the channel setting and the transmission power of the relay device 20 by using the resource utilization computed from the monitoring result.

The design control unit 426 controls the design of the network on the basis of the result of the status monitoring. Specifically, the design control unit 426 presents an increase or a decrease in the number of the relay device 20 or other network devices in the group or changes in an arrangement of the relay device 20 or other network devices in the group to balance the communication load.

The terminal setting control unit 427 controls settings in the LPWA terminal 10 or a user application on the basis of the result of the status monitoring. Specifically, the terminal setting control unit 427 controls settings in the LPWA terminal 10 or the user application by using congestion information and alive information indicated by the result of the status monitoring.

The display control unit 428 controls the display unit 45. For example, the display control unit 428 may cause an example of a change in an arrangement proposed by the design control unit 426 to be displayed.

The storage unit 43 stores a device information database 431 and a station placement information database 432. The storage unit 43 is configured using a storage device such as a magnetic hard disk device or a semiconductor memory device.

The device information database 431 stores information obtained from the monitoring agent 30 in association with the terminal ID.

The station placement information database 432 is a database in which information related to the placement location of each device is registered. For example, identification information for each device (LPWA terminal 10 and relay device 20) and a placement location are registered in association with each other in the station placement information database 432. The identification information for each device is information for identifying each LPWA terminal 10 and relay device 20. For example, the identification information for the LPWA terminal 10 may be the MAC address of the LPWA terminal 10, and may be information that is unique to each LPWA terminal 10. As another example, the identification information for the relay device 20 may be the MAC address of the relay device 20, and may be information that is unique to each relay device 20. The placement location expresses information about the locations where the LPWA terminal 10 and the relay device 20 are placed. For example, the placement location is latitude and longitude.

The second communication unit 44 communicates with the relay device 20 and the user server 50.

The display unit 45 is an image display device such as a liquid crystal display, an organic electroluminescence (EL) display, or a cathode ray tube (CRT) display. The display unit 45 displays the monitoring device 40. The display unit 45 may also be an interface for connecting an image display device to the monitoring device 40. In this case, the display unit 45 generates an image signal for displaying the monitoring device 40, and outputs the image signal to an image display device connected to itself.

Figure 7:
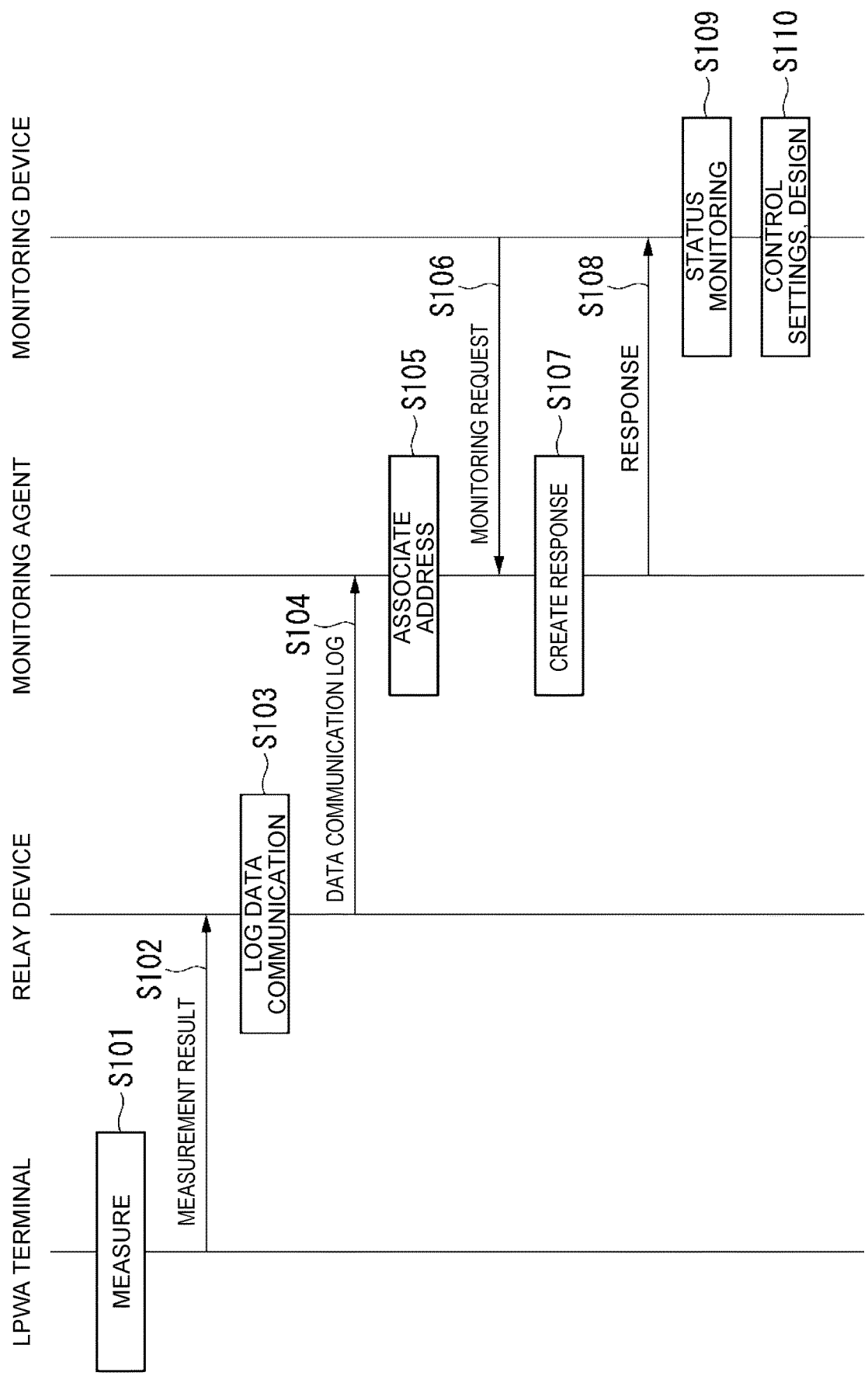
FIG. 7 is a sequence diagram illustrating a flow of a monitoring system according to the embodiment.

FIG. 7 is a sequence diagram illustrating a flow of the monitoring system 100 according to the embodiment.

The LPWA terminal 10 measures a property of the environment (step S101). The LPWA terminal 10 periodically transmits a measurement result to the relay device 20 (step S102).

The relay device 20 receives the measurement result transmitted from the LPWA terminal 10. At this time, the relay device 20 acquires the time at which the measurement result is received, and also measures the received signal strength. The relay device 20 logs the measurement result in association with the time of receipt, the received signal strength, the wireless channel, and the payload size as the data communication log (step S103).

The above steps S101 to S103 are executed periodically.

The relay device 20 periodically transmits the data communication log to the monitoring agent 30 (step S104).

The first communication unit 31 of the monitoring agent 30 receives the data communication log transmitted from the relay device 20. The first communication unit 31 outputs the received data communication log to the data recording unit 321. The data recording unit 321 associates the data communication log with an IP address on the basis of the data communication log and the association database 331 (step S105). Specifically, first, the data recording unit 321 reads out the association database 331 from the storage unit 33. Next, the data recording unit 321 references the terminal ID field in the read-out association database 331, and acquires the record corresponding to the terminal ID included in the data communication log. Next, the data recording unit 321 acquires the IP address registered in the IP address field of the acquired record. Additionally, the data recording unit 321 newly registers the acquired IP address in association with the data communication log in the communication log database 332.

The information requesting unit 421 of the monitoring device 40 generates a monitoring request based on the monitoring communication protocol at a user-specified or predetermined timing. The information requesting unit 421 controls the first communication unit 41 to transmit the generated monitoring request to the destination monitoring agent 30 (step S106).

The second communication unit 34 receives the monitoring request transmitted from the monitoring device 40. The second communication unit 34 outputs the received monitoring request to the response generation unit 322. The response generation unit 322 generates a response according to the monitoring request (step S107). Specifically, first, the response generation unit 322 reads out the analysis table 333 stored in the storage unit 33. Next, the response generation unit 322 references the read-out analysis table 333, and analyzes the monitoring protocol attribute name included in the monitoring request. For example, in the case where the value "1.3.6.1.4.1.1.1.1.0" is included in the monitoring request as the monitoring communication protocol attribute name, the response generation unit 322 references the read-out analysis table 333 to determine by analysis that the monitoring protocol attribute name "1.3.6.1.4.1.1.1.1.0" included in the monitoring request is the "Received Signal Strength" column name of the communication log database 332.

Next, the response generation unit 322 references the IP address of the communication log database 332, and acquires the record corresponding to the IP address included in the monitoring request. Next, the response generation unit 322 acquires the values of the fields corresponding to the analyzed column name from among the fields registered in the acquired record. Additionally, the response generation unit 322 generates a response containing the acquired value of the field corresponding to the analyzed column name. The response generation unit 322 controls the second communication unit 44 to transmit the generated response to the monitoring device 40 (step S108).

The first communication unit 41 receives the response transmitted from the monitoring agent 30. The first communication unit 41 outputs the received response to the control unit 42. The control unit 42 registers the response in the device information database 431. Thereafter, the control unit 42 performs status monitoring on the basis of the information registered in the device information database 431 (step S109). The status monitoring performed by the monitoring device 40 includes congestion determination, communication quality estimation, and obstruction determination. Details about each type of status monitoring will be described later. The control unit 42 performs either or both of controlling the settings in each device (LPWA terminal 10 and relay device 20) and controlling the network design on the basis of the result of the status monitoring (step S110). Details about controlling the settings in each device and controlling the network design will be described later.

Figure 8:
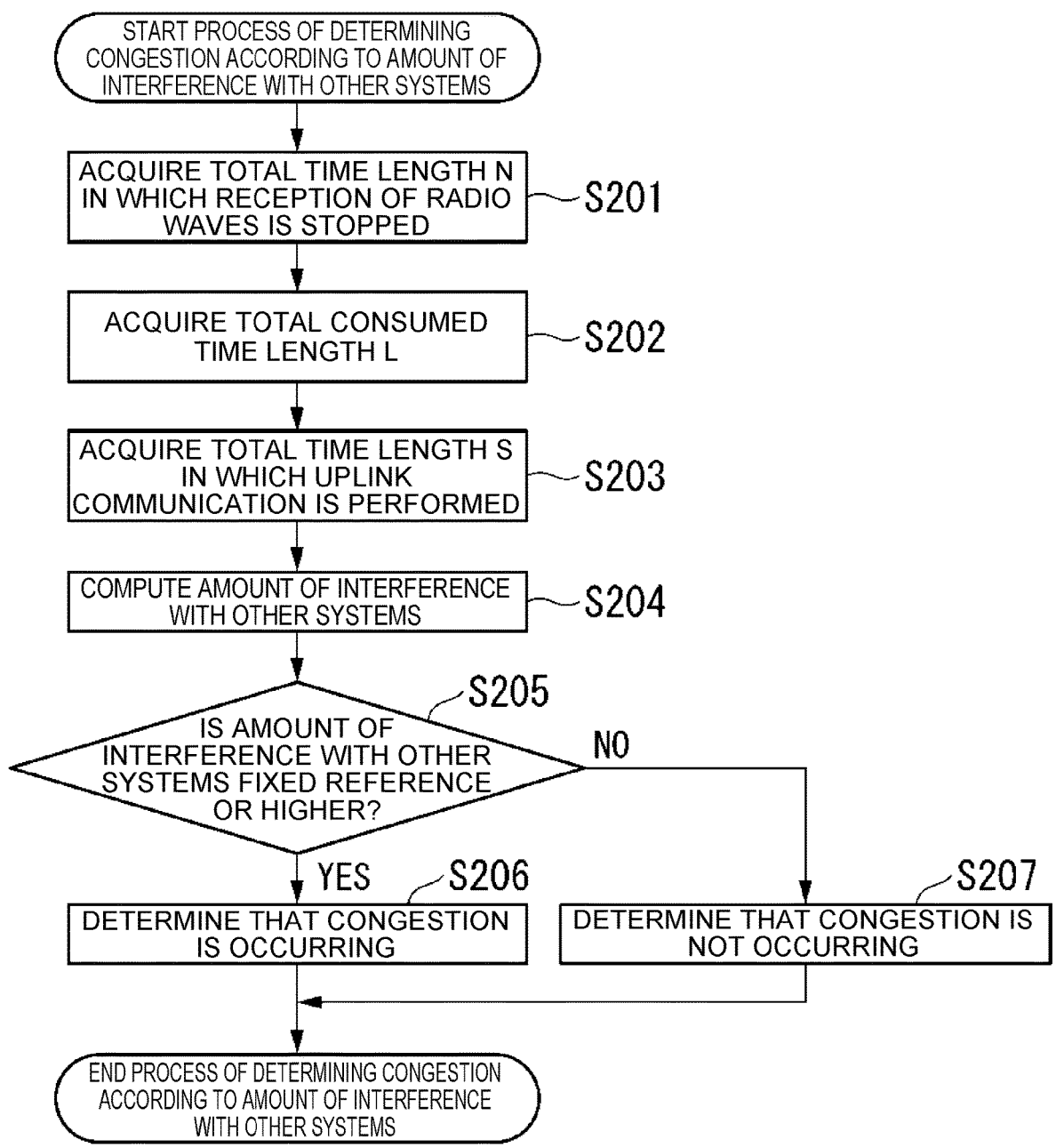
FIG. 8 is a flowchart illustrating the flow of a congestion determination process performed by the monitoring device according to the embodiment.

FIG. 8 is a flowchart illustrating the flow of a congestion determination process performed by the monitoring device 40 according to the embodiment. Note that in FIG. 8, a congestion determination process according to the amount of interference with other systems will be described. The congestion determination unit 422 acquires, from the relay device 20, a total stopped time length N in which the reception of radio waves has been stopped by carrier sense within a certain period (for example, one hour) (step S201). The congestion determination unit 422 acquires, from the relay device 20, a total consumed time length L consumed by receiving packets from the LPWA terminal 10, including those addressed to other systems, within a certain period (for example, one hour) (step S202).

The congestion determination unit 422 acquires a total uplink communication time length S in which a plurality of LPWA terminals 10 have performed uplink communication using the relay device 20 (step S203). The congestion determination unit 422 computes the amount of communication by other systems (the amount of interference with other systems) on the basis of the acquired stopped time length N, the consumed time length L, and the uplink communication time length S (step S204). Specifically, the congestion determination unit 422 computes the amount of communication with other systems (the amount of interference with other systems) on the basis of the following Expression (1).

$$\text{Amount of interference with other systems} = \text{Stopped time length } N + \text{Consumed time length } L - \text{Uplink communication time length } S \quad (1)$$

The congestion determination unit 422 determines whether or not the computed amount of interference with other systems is a fixed reference or higher (step S205). In the case where the computed amount of interference with other systems is the fixed reference or higher (step S205, Yes), the congestion determination unit 422 determines that congestion is occurring (step S206).

On the other hand, in the case where the computed amount of interference with other systems is lower than the fixed reference (step S205, No), the congestion determination unit 422 determines that congestion is not occurring (step S207).

Figure 9:
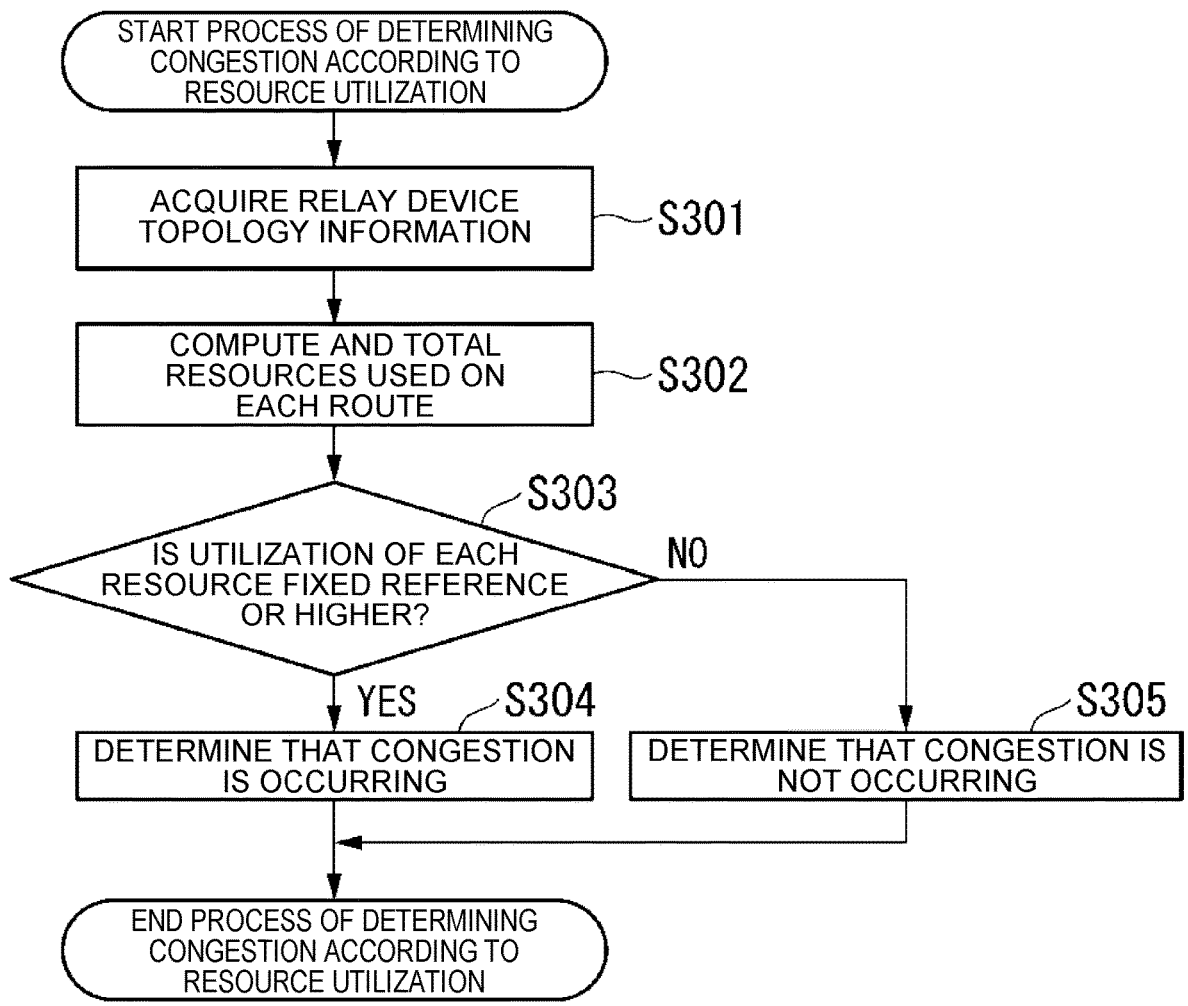
FIG. 9 is a flowchart illustrating the flow of a congestion determination process performed by the monitoring device according to the embodiment.

FIG. 9 is a flowchart illustrating the flow of a congestion determination process performed by the monitoring device 40 according to the embodiment. Note that in FIG. 9, a congestion determination process according to resource utilization will be described.

The congestion determination unit 422 acquires relay device 20 topology information from the relay device 20 (step S301). Topology information refers to information expressed by all devices connected to the relay device 20 and information about routes connecting each device. From the topology information, it is possible to acquire information such as which devices are connected to the relay device 20 and which routes connect the devices. The congestion determination unit 422 totals the resources used by each route for uplink communication and downlink communication by each LPWA terminal 10 from the acquired topology information (step S302). Here, the resources are wireless channels, the relay device 20, wired links, the user server 50, and the like.

The congestion determination unit 422 determines whether or not the utilization of each resource is a fixed reference or higher (step S303). In the case where the utilization of each resource is the fixed reference or higher (step S303, Yes), the congestion determination unit 422 determines that congestion is occurring (step S304).

On the other hand, in the case where one or all of the utilization of the resources is less than the fixed reference (step S303, No), the congestion determination unit 422 determines that congestion is not occurring (step S305).

As described above, in FIG. 9, the resource utilization is computed on the basis of the amount of traffic by the LPWA terminals 10.

Figure 10:
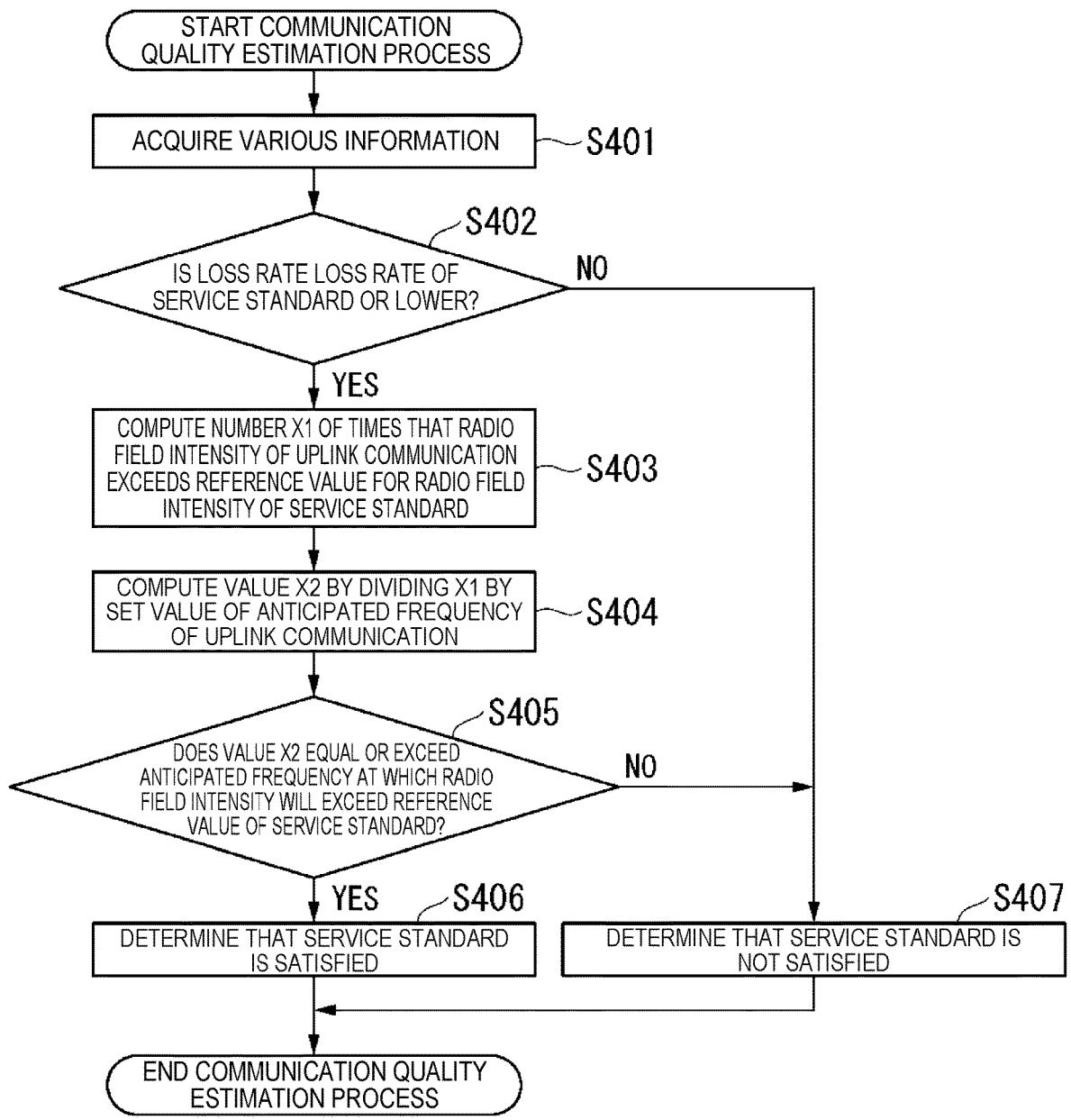
FIG. 10 is a flowchart illustrating the flow of a communication quality estimation process performed by the monitoring device according to the embodiment.

FIG. 10 is a flowchart illustrating the flow of a communication quality estimation process performed by the monitoring device 40 according to the embodiment.

The communication quality estimation unit 423 acquires a set value of the anticipated frequency of uplink communication, the loss rate of a service standard, a reference value of the radio field intensity, and an anticipated frequency at which the radio field intensity will exceed the reference value of the radio field intensity (step S401). The loss rate expresses the probability of missing an incoming transmission due to a lack of capacity on the communication channel. The loss rate is computed on the basis of the ratio of the anticipated frequency of uplink communication and the frequency derived from the data communication log.

The communication quality estimation unit 423 determines whether or not the loss rate is equal to or lower than the loss rate of the service standard (step S402). Specifically, first, the communication quality estimation unit 423 divides the frequency of uplink communication derived from the data communication log by the anticipated frequency of uplink communication. Next, the communication quality estimation unit 423 computes the loss rate by subtracting the quotient from 1. Additionally, the communication quality estimation unit 423 determines whether the computed loss rate is equal to or less than the loss rate of the service standard. In the case where the loss rate is equal to or less than the loss rate of the service standard (step S402, Yes), the communication quality estimation unit 423 computes a number X1 of the times that the radio field intensity of uplink communication acquired from the communication log has exceeded the reference value of the radio field intensity of the service standard (step S403).

The communication quality estimation unit 423 divides the computed number X1 by the set value of the anticipated frequency of uplink communication to compute the quotient X2 (step S404). The communication quality estimation unit 423 determines whether or not the computed quotient X2 is equal to or greater than the anticipated frequency at which the radio field intensity will exceed the reference value of the service standard (step S405). In the case where the quotient X2 is equal to or greater than the anticipated frequency at which the radio field intensity will exceed the reference value of the service standard (step S405, Yes), the communication quality estimation unit 423 determines that the service standard is satisfied (step S406). The service standard being satisfied means that the communication quality is good.

On the other hand, in the case where the loss rate is greater than the loss rate of the service standard (step S402, No), or in the case where the quotient X2 is less than the anticipated frequency at which the radio field intensity will exceed the reference value of the service standard (step S405, No), the communication quality estimation unit 423 determines that the service standard is not satisfied (step S407). The service standard not being satisfied means that the communication quality is poor.

Figure 11:
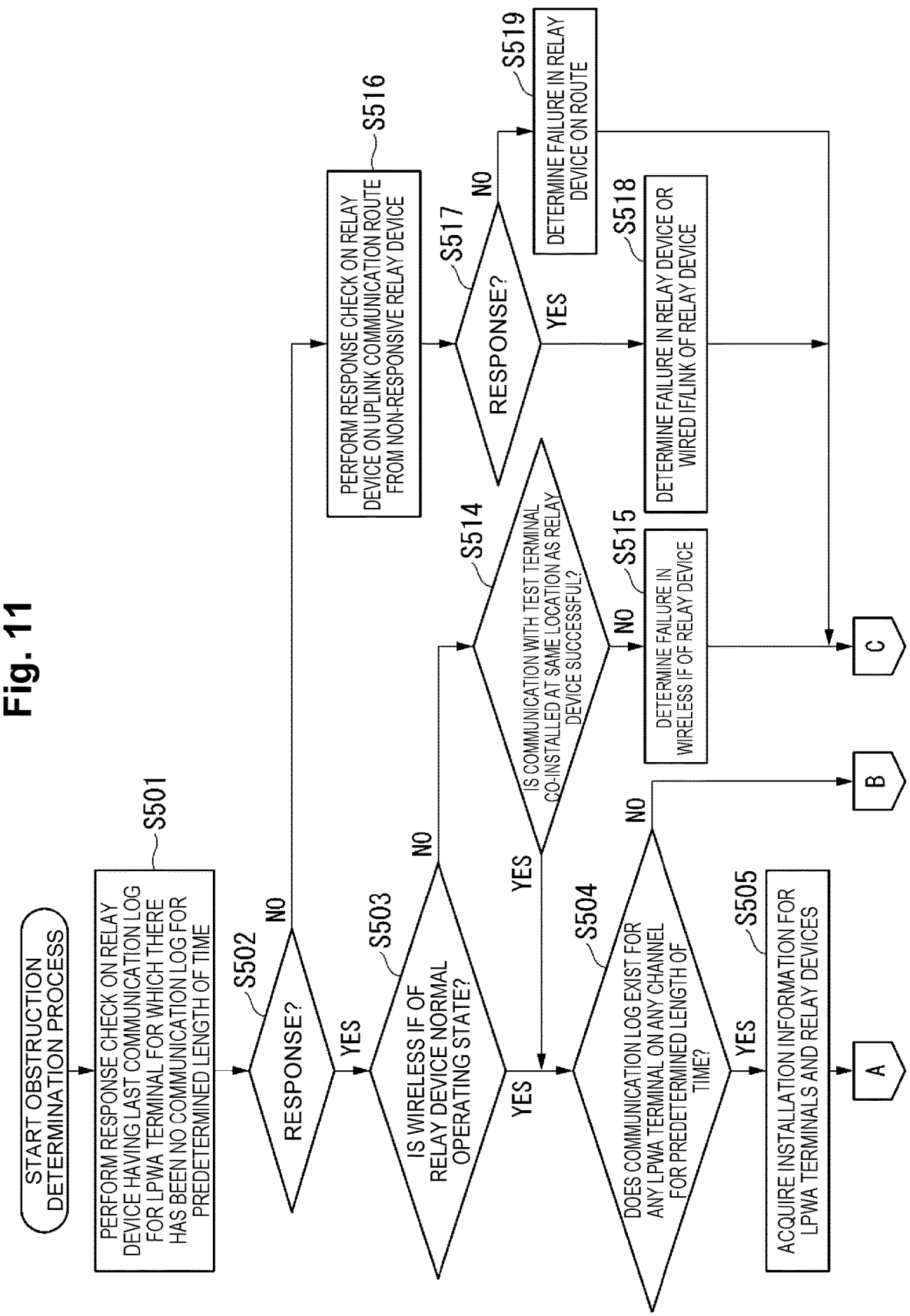
FIG. 11 is a flowchart illustrating the flow of an obstruction determination process performed by the monitoring device according to the embodiment.
Figure 12:
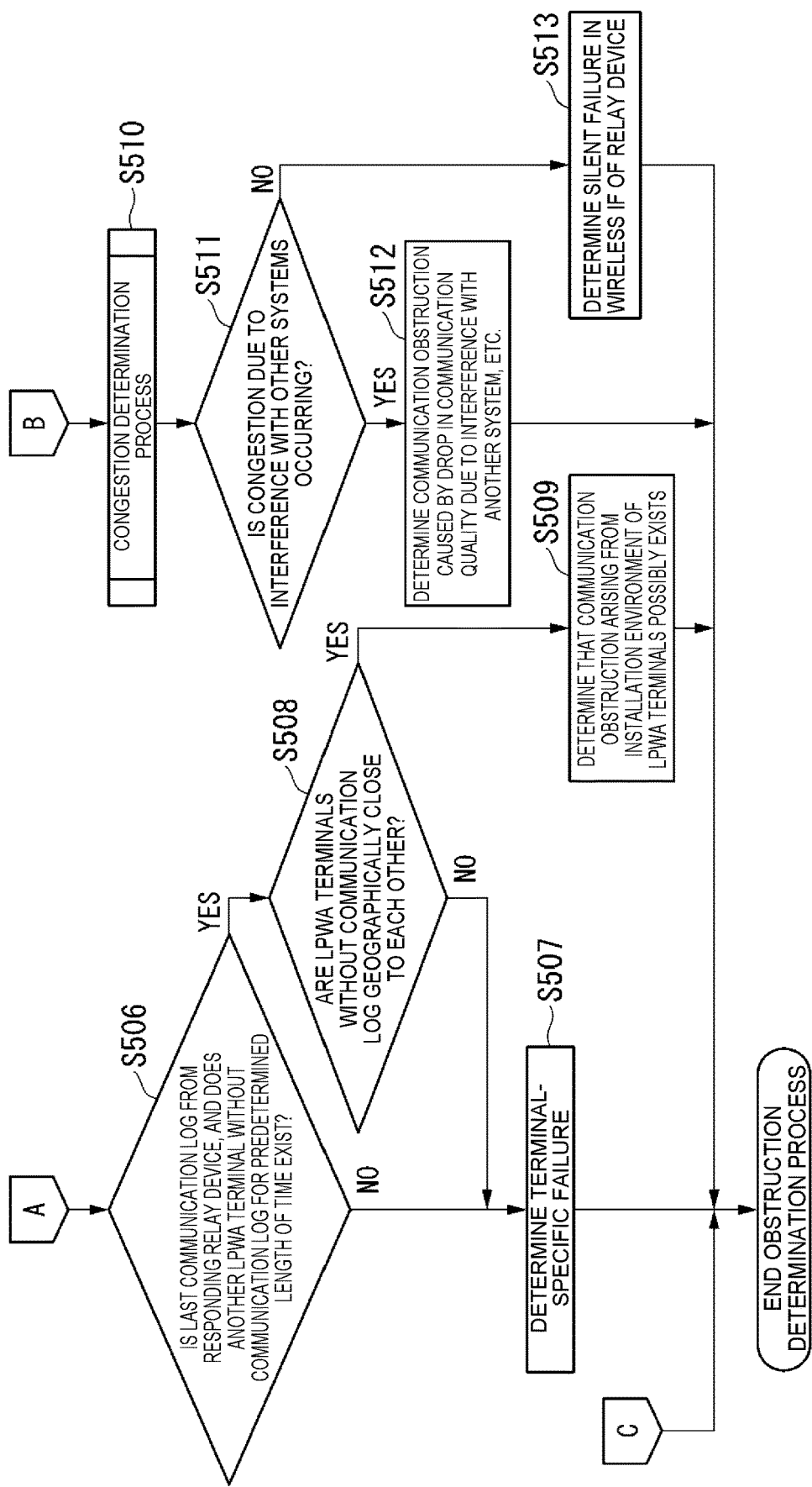
FIG. 12 is a flowchart illustrating the flow of an obstruction determination process performed by the monitoring device according to the embodiment.

FIGS. 11 and 12 are flowcharts illustrating the flow of an obstruction determination process performed by the monitoring device 40 according to the embodiment. Note that the process in FIGS. 11 and 12 is executed in the case where there is no communication log for a predetermined length of time with any LPWA terminal 10.

The obstruction determination unit 424 performs a response check on the relay device 20 having the last communication log for the LPWA terminal 10 for which there has been no communication log for a predetermined length of time (step S501). The obstruction determination unit 424 determines whether or not there is a response from the relay device 20 (step S502). In the case where there is a response from the relay device 20 (step S502, Yes), the obstruction determination unit 424 determines whether or not the wireless IF of the relay device 20 that transmitted the response is in a normal operating state (step S503).

In the case of a normal operating state (step S503, Yes), the obstruction determination unit 424 determines whether there has been a communication log for any LPWA terminal 10 on any channel for a predetermined length of time (step S504). In the case where there has been a communication log for any LPWA terminal 10 on any channel (step S504, Yes), the obstruction determination unit 424 references the station placement information database 432 and acquires mapping information for all LPWA terminals 10 and all relay devices 20 (step S505). The obstruction determination unit 424 determines whether or not the last communication log is from the relay device 20 that transmitted the response and also whether another LPWA terminal 10 without a communication log for a predetermined length of time exists (step S506).

In the case of satisfying one or both of the conditions that the last communication log is not from the relay device 20 that transmitted the response and no other LPWA terminal 10 without a communication log for a predetermined length of time exists (step S506, No), the obstruction determination unit 424 determines that a terminal-specific obstruction exists (step S507). After that, the monitoring device 40 ends the obstruction determination process.

On the other hand, in the case where the last communication log is from the relay device 20 that transmitted the response and another LPWA terminal 10 without a communication log for a predetermined length of time exists (step S506, Yes), the obstruction determination unit 424 determines whether or not a plurality of LPWA terminals 10 without a communication log are geographically close to each other (step S508).

For example, in the case where the geographical distance between the LPWA terminals 10 without a communication log is less than a predetermined distance, the obstruction determination unit 424 determines that the plurality of LPWA terminals 10 without a communication log are geographically close to each other. On the other hand, in the case where the geographical distance between the LPWA terminals 10 without a communication log is the predetermined distance or greater, the obstruction determination unit 424 determines that the plurality of LPWA terminals 10 without a communication log are not geographically close to each other.

In the case where the LPWA terminals 10 without a communication log are not geographically close to each other (step S508, No), the obstruction determination unit 424 determines that a terminal-specific obstruction exists (step S507). After that, the monitoring device 40 ends the obstruction determination process.

On the other hand, in the case where a plurality of LPWA terminals 10 without a communication log are geographically close to each other (step S508, Yes), the obstruction determination unit 424 determines that there is a possibility of a communication obstruction arising from the installation environment of the LPWA terminals 10 (step S509). After that, the monitoring device 40 ends the obstruction determination process.

Also, in the process of step S504, in the case where there has been no communication log for any LPWA terminal 10 on any channel (step S504, No), or in other words, in the case where a communication log has been recorded for none of the LPWA terminals 10 on none of the channels, the congestion determination unit 422 performs the congestion determination process on the relay device 20 that transmitted the response (step S510).

As a result of the congestion determination process, the obstruction determination unit 424 determines whether or not congestion with other systems is occurring (step S511). In the case of determining that congestion with other systems is occurring (step S511, Yes), the obstruction determination unit 424 determines that a communication obstruction caused by a drop in communication quality due to interference with another system or the like exists (step S512). After that, the monitoring device 40 ends the obstruction determination process.

On the other hand, in the case of not determining that congestion with other systems is occurring (step S511, No), the obstruction determination unit 424 determines that the wireless IF of the relay device 20 that transmitted the response is called a siren (step S513). After that, the monitoring device 40 ends the obstruction determination process.

Also, in the process of step S503, in the case where the operating state is not normal (step S503, No), the obstruction determination unit 424 determines whether or not communication with a test terminal co-installed at the same location as the responding relay device is successful (step S514). In the case where communication with the test terminal co-installed at the same location as the responding relay device is successful (step S514, Yes), the obstruction determination unit 424 executes the process from step S504.

On the other hand, in the case where communication with the test terminal co-installed at the same location as the responding relay device is unsuccessful (step S514, No), the obstruction determination unit 424 determines that a failure exists in the wireless IF of the responding relay device (step S515). After that, the monitoring device 40 ends the obstruction determination process.

Also, in the process of step S502, in the case where there is no response from the relay device 20 (step S502, No), the obstruction determination unit 424 performs a response check on a relay device 20 on the uplink communication route from the non-responsive relay device (step S516). The obstruction determination unit 424 determines whether or not there is a response from the relay device 20 (step S517). In the case where there is a response from the relay device 20 (step S517, Yes), the obstruction determination unit 424 determines that a failure exists in the relay device 20 or in the wired IF or link of the relay device 20 (step S518). After that, the monitoring device 40 ends the obstruction determination process.

On the other hand, in the case where there is no response from the relay device 20 (step S517, No), the obstruction determination unit 424 determines that a failure exists in the relay device 20 on the route (step S519). After that, the monitoring device 40 ends the obstruction determination process.

Figure 13:
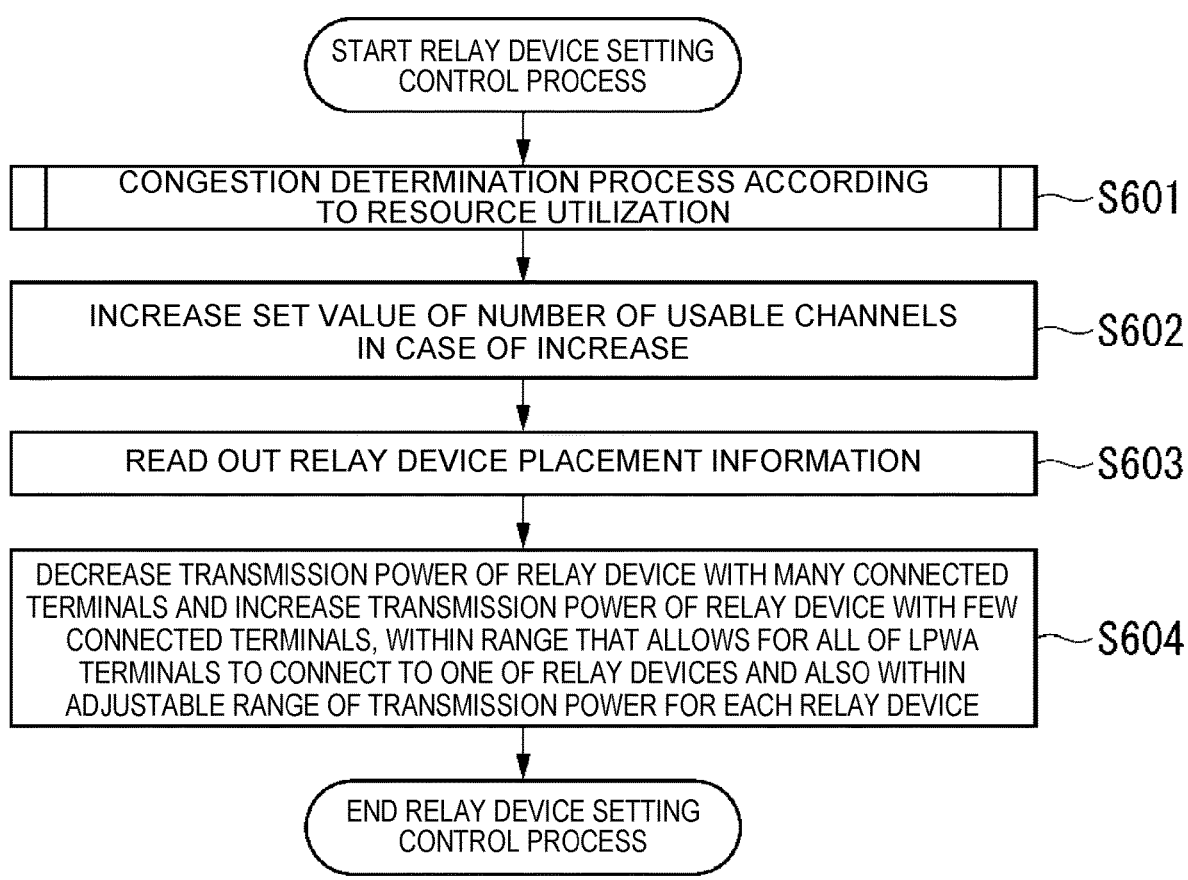
FIG. 13 is a flowchart illustrating the flow of a relay device setting control process performed by the monitoring device according to the embodiment.

FIG. 13 is a flowchart illustrating the flow of a relay device setting control process performed by the monitoring device 40 according to the embodiment.

The congestion determination unit 422 performs the congestion determination process according to resource utilization (step S601). The relay device setting control unit 425 increases the set value of the number of usable channels in the case where the set value is to be increased (step S602). The relay device setting control unit 425 reads out the station placement information database 432 stored in the storage unit 43 (step S603). The relay device setting control unit 425 controls each relay device 20 to decrease the transmission power of a relay device 20 with many connected terminals and increase the transmission power of a relay device 20 with few connected terminals, within a range that allows for all of the LPWA terminals 10 to connect to one of the relay devices 20 and also within the adjustable range of the transmission power for each relay device 20 (step S604).

Figure 14:
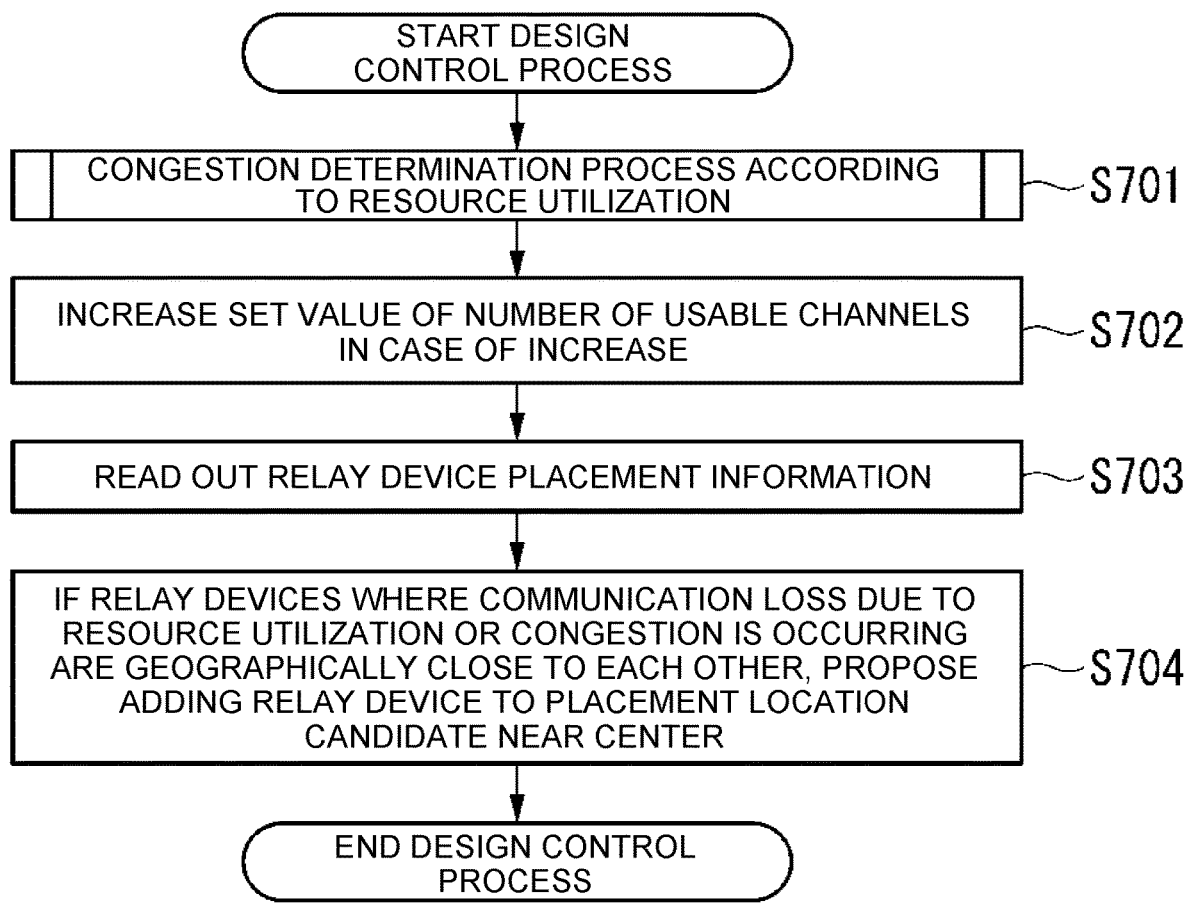
FIG. 14 is a flowchart illustrating the flow of a design control process performed by the monitoring device according to the embodiment.

FIG. 14 is a flowchart illustrating the flow of a design control process performed by the monitoring device 40 according to the embodiment.

The congestion determination unit 422 performs the congestion determination process according to resource utilization (step S701). The design control unit 426 increases the set value of the number of usable channels in the case where the set value is to be increased (step S702). The design control unit 426 reads out the station placement information database 432 stored in the storage unit 43 (step S703). In the case where a plurality of relay devices 20 where communication loss due to resource utilization or congestion is occurring are geographically close to each other, the design control unit 426 determines to add a relay device 20 to a placement location candidate near the center. The display control unit 428 presents the determined information to a user via the display unit 45 (step S704).

Figure 15:
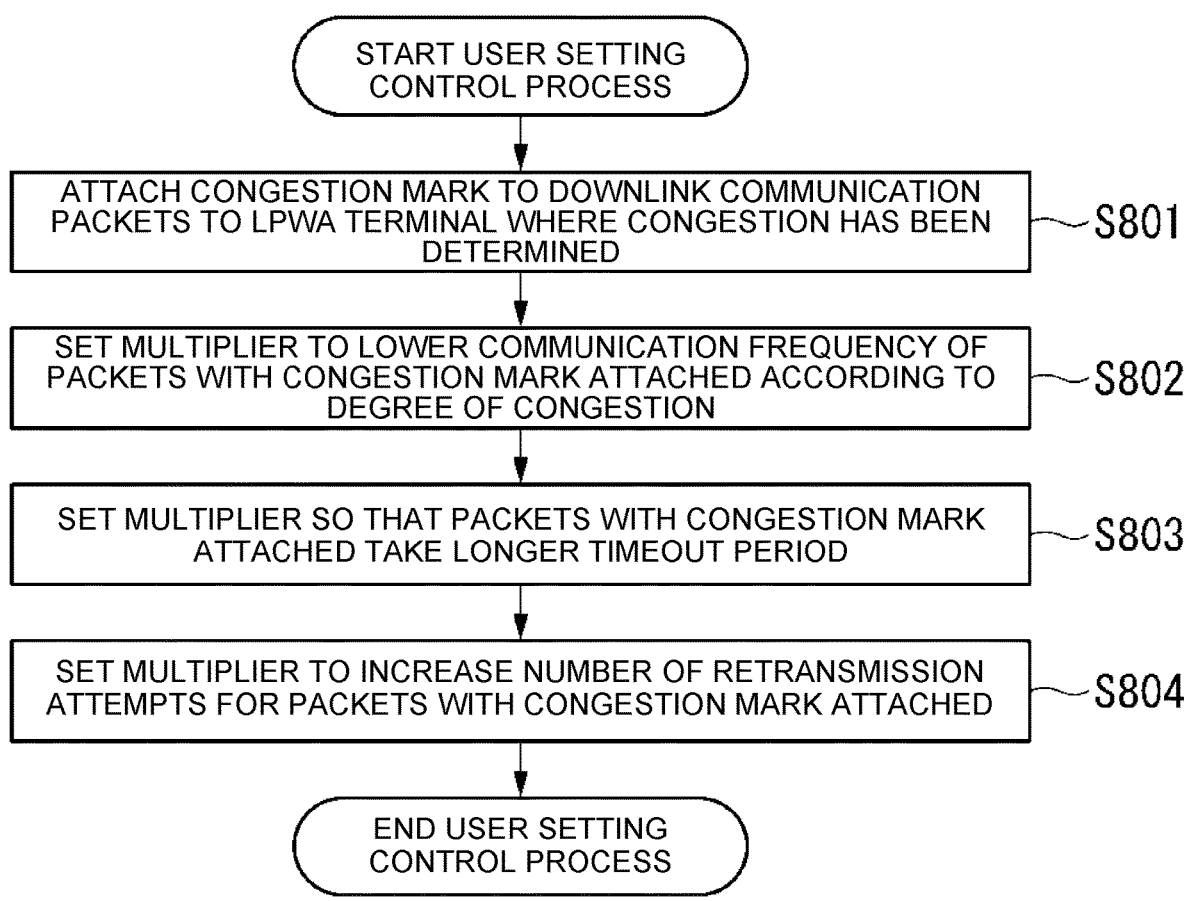
FIG. 15 is a flowchart illustrating the flow of a user setting control process performed by the monitoring device according to the embodiment.

FIG. 15 is a flowchart illustrating the flow of a user setting control process performed by the monitoring device 40 according to the embodiment. Note that in FIG. 15, a user setting control process using congestion information will be described.

The terminal setting control unit 427 attaches a congestion mark to downlink communication packets to each LPWA terminal 10 where congestion has been determined (step S801). The congestion mark is a mark attached to distinguish the packets from normal packets. The terminal setting control unit 427 sets a multiplier of each LPWA terminal 10 to lower the communication frequency of packets with the congestion mark attached according to the degree of congestion (step S802). The terminal setting control unit 427 sets the multiplier of each LPWA terminal 10 so that packets with the congestion mark attached take a longer timeout period (step S803). The terminal setting control unit 427 sets the multiplier of each LPWA terminal 10 to increase the number of retransmission attempts for packets with the congestion mark attached (step S804).

Figure 16:
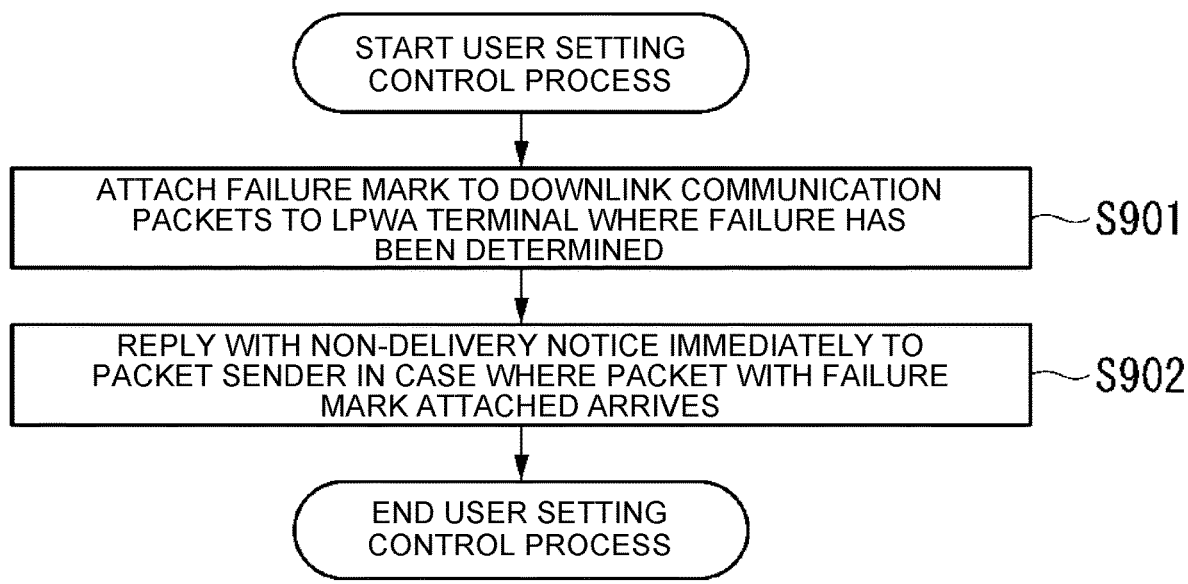
FIG. 16 is a flowchart illustrating the flow of a user setting control process performed by the monitoring device according to the embodiment.

FIG. 16 is a flowchart illustrating the flow of a user setting control process performed by the monitoring device 40 according to the embodiment. Note that in FIG. 16, a user setting control process using alive information will be described.

The terminal setting control unit 427 attaches a failure mark to downlink communication packets to each LPWA terminal 10 where a failure has been determined (step S901). The failure mark is a mark attached to distinguish the packets from normal packets. The terminal setting control unit 427 controls the settings of each LPWA terminal 10 so that a non-delivery notice is replied immediately to the packet sender in the case where a packet with the failure mark attached arrives (step S902).

According to the monitoring system 100 configured as above, the monitoring agent 30 acts as a proxy for the LPWA terminal 10 to response to a request from the monitoring device 40. Specifically, the monitoring agent 30 periodically acquires information related to the communication status of the LPWA terminal 10 from the relay device 20. Additionally, in the case where there is a monitoring request from the monitoring device 40, the monitoring agent 30 generates a response to the monitoring request on the basis of the information related to the communication status of the LPWA terminal 10, and transmits the generated response to the monitoring device 40. With this arrangement, the LPWA terminal 10 and the monitoring device 40 do not communicate directly. Consequently, the LPWA terminal 10 does not have to respond to the monitoring request, thereby making it possible to reduce the power consumption of the LPWA terminal 10.

Also, in the monitoring system 100, a plurality of LPWA terminals 10 are aggregated and monitored as a group under a single IP address. The units of aggregation are the LPWA terminals 10 connected the same relay device 20, for example. By managing the status in units of groups in this way, status information that is not estimated with respect to a single device (such as relay path congestion and area-level obstructions, for example) can be estimated.

Additionally, the relay device 20 to which the LPWA terminal 10 connects in the monitoring system 100 has simplified functions, and typically lacks functions for ascertaining and managing the LPWA terminal 10. Consequently, in the present embodiment, it is not necessary to set up functions for monitoring the LPWA terminal 10 in the relay device 20. For this reason, the costs associated with the relay device 20 can be lowered.

Modifications

The LPWA terminal 10 may also transmit the measurement result to the relay device 20 on an interval specified by the relay device 20.

The first communication unit 31 and the second communication unit 34 provided in the monitoring agent may also be configured as a single communication unit. The first communication unit 41 and the second communication unit 44 provided in the monitoring device 40 may also be configured as a single communication unit.

The measurement result may also contain only one of either the terminal ID or the terminal address.

The congestion determination unit 422, the communication quality estimation unit 423, and the obstruction determination unit 424 may also be configured as a status determination unit that determines the status of the LPWA terminal 10. When configured in this way, the status determination unit performs any or all of congestion determination, communication quality estimation, and obstruction determination as status monitoring of the LPWA terminal 10.

The relay device setting control unit 425, the design control unit 426, and the terminal setting control unit 427 may also be configured as a setting and design control unit. When configured in this way, the setting and design control unit performs any or all of controlling settings in the relay device 20 to which the LPWA terminal 10 connects, controlling the network design, and controlling settings in the LPWA terminal 10. The setting and design control unit may also perform any or all of controlling settings in the relay device 20 to which the LPWA terminal 10 connects, controlling the network design, and controlling settings in the LPWA terminals 10 on the basis of any of communication quality and the amount of interference with other systems in addition to resource utilization.

The foregoing describes an embodiment of the present invention in detail and with reference to the drawings. However, specific configurations are not limited to this embodiment, and also include designs and the like within a scope that does not depart from the gist the present invention.

REFERENCE SIGNS LIST

10 LPWA terminal (low power terminal)
20 relay device
30 monitoring agent
31 first communication unit
32 control unit
33 storage unit
34 second communication unit
40 monitoring device
50 user server
321 data recording unit
322 response generation unit
331 association database
332 communication log database
333 analysis table
41 first communication unit
42 control unit
43 storage unit
44 second communication unit
45 display unit
421 information requesting unit
422 congestion determination unit
423 communication quality estimation unit
424 obstruction determination unit
425 relay device setting control unit
426 design control unit
427 terminal setting control unit
428 display control unit 431 device information database
432 station placement information database

The invention claimed is:

1. A monitoring system comprising:
a monitoring agent configured to keep information related to a communication status of a low-power terminal that communicates under low power; and
a monitoring device configured to monitor the status of the low-power terminal, wherein
the monitoring device includes
a requesting unit, including one or more processors, configured to request information related to the communication status of the low-power terminal, and
the monitoring agent includes
a response generation unit, including one or more processors, configured to generate a response to the request from the monitoring device on a basis of the information related to the communication status of the low-power terminal, and
a transmission unit, including one or more processors, configured to transmit the response to the monitoring device;
wherein:
the monitoring device further includes a status determination unit, including one or more processors, configured to determine the status of the low-power terminal on a basis of information included in the response,
the status determination unit is configured to perform one or more of congestion determination, communication quality estimation, or obstruction determination as status monitoring of the low-power terminal, on the basis of the information included in the response, and
the status determination unit is configured to compute a resource utilization and an amount of interference with another system on a basis of an amount of traffic in a group and a time ratio of interference with another system, estimate a communication quality in the group on a basis of a communication frequency and a received signal strength in the group, and estimate a failure location in the group on a basis of the communication frequency and a packet loss rate.

2. The monitoring system according to claim 1, wherein the monitoring agent configured to group a plurality of the low-power terminals under singular address information, and
the response generation unit configured to generate the response to the request from the monitoring device in units of groups.

3. The monitoring system according to claim 1, further comprising:
a setting and design control unit, including one or more processors, configured to perform one or more of controlling a setting in a relay device to which the low-power terminal connects, controlling a network design, or controlling a setting in the low-power terminal on a basis of a result of the status monitoring.

4. The monitoring system according to claim 3, wherein the setting and design control unit is configured to control one or more of a channel setting or a transmission output in the relay device, a communication route in a group including the relay device and the low-power terminal, or a setting in the low-power terminal according to a resource utilization, a communication quality, an amount of interference with another system, or a failure location.

5. The monitoring system according to claim 3, wherein the setting and design control unit is configured to increase or decrease a number of the relay devices or changes an arrangement of the relay devices to balance a communication load on a basis of one or more of a resource utilization, a communication quality, or an amount of interference with another system, as the controlling of the network design.

* * * * *